(12) United States Patent
Kim et al.

(10) Patent No.: US 9,616,511 B2
(45) Date of Patent: Apr. 11, 2017

(54) WIRE SAW

(71) Applicant: KOREA INSTITUTE OF INDUSTRIAL TECHNOLOGY, Chungcheongnam-do (KR)

(72) Inventors: Hyoung Jae Kim, Busan (KR); Hyung Ho Jo, Busan (KR); Sang Jik Lee, Busan (KR); Do Yeon Kim, Busan (KR); Tae Kyung Lee, Gyeongsangnam-do (KR); Chul Jin Park, Busan (KR)

(73) Assignee: KOREA INSTITUTE OF INDUSTRIAL TECHNOLOGY, Chungcheongnam-Do (KR)

( * ) Notice: Subject to any disclaimer, the term of this patent is extended or adjusted under 35 U.S.C. 154(b) by 0 days.

(21) Appl. No.: 14/767,539

(22) PCT Filed: Nov. 25, 2013

(86) PCT No.: PCT/KR2013/010743
§ 371 (c)(1),
(2) Date: Aug. 12, 2015

(87) PCT Pub. No.: WO2014/157805
PCT Pub. Date: Oct. 2, 2014

(65) Prior Publication Data
US 2015/0375317 A1    Dec. 31, 2015

(30) Foreign Application Priority Data

Mar. 25, 2013 (KR) .................... 10-2013-0031668

(51) Int. Cl.
B23D 57/00 (2006.01)
B28D 5/04 (2006.01)
B28D 7/04 (2006.01)

(52) U.S. Cl.
CPC ......... *B23D 57/0046* (2013.01); *B28D 5/045* (2013.01); *B28D 7/04* (2013.01)

(58) Field of Classification Search
CPC ....... B23D 57/0046; B28D 5/045; B28D 7/04
(Continued)

(56) References Cited

U.S. PATENT DOCUMENTS 3,272,195 A * 9/1966 Myer .................. B28D 5/042
125/16.01
3,539,773 A    11/1970 Wilson
(Continued)

FOREIGN PATENT DOCUMENTS

JP    H09300342    11/1997
JP    2004268508    9/2004
(Continued)

*Primary Examiner* — George Nguyen
(74) *Attorney, Agent, or Firm* — IPLA P.A.; James E. Bame

(57) ABSTRACT

Provided is a wire saw (1) that cuts an ingot (I) while swinging the ingot. The wire saw (1) includes a first driving block (100), a second driving block (110), and an ingot holder (120). When the first driving block (100) moves, the second driving block (110) moves in a direction perpendicular to a moving direction of the first driving block (100), and simultaneously the ingot holder (120) is swung. The ingot holder (120) is transferred to a z-axial direction in which the ingot is cut by a lifting block (73), and the lifting block (73) moves independently of the first or second driving block (100 or 1110). Thus, the ingot (I) can be swung separately from the lifting block (73), and be inhibited from moving left and right. Since only the first driving block (100) is controlled, easy control and a simple structure are provided.

11 Claims, 12 Drawing Sheets

(58) Field of Classification Search
USPC .......................................................... 125/21
See application file for complete search history.

(56) References Cited

U.S. PATENT DOCUMENTS

| | | | |
|---|---|---|---|
| 4,646,710 A | | 3/1987 | Schmid et al. |
| 5,735,258 A | * | 4/1998 | Okuno .................. B28D 5/045 |
| | | | 125/13.03 |
| 5,842,462 A | * | 12/1998 | Schmid .............. B23D 57/0046 |
| | | | 125/16.02 |
| 6,065,461 A | | 5/2000 | Asakawa et al. |
| 6,145,422 A | * | 11/2000 | Katamachi ........... B23Q 16/001 |
| | | | 125/21 |
| 6,886,550 B2 | * | 5/2005 | Hauser ............... B23D 57/0046 |
| | | | 125/16.01 |
| 6,923,171 B2 | * | 8/2005 | Hammer ............. B28D 5/0088 |
| | | | 125/16.02 |
| 6,945,242 B2 | * | 9/2005 | Kondo ............. B23D 57/0053 |
| | | | 125/21 |
| 6,981,495 B2 | * | 1/2006 | Muller ................ B28D 5/0088 |
| | | | 125/16.02 |
| 2003/0145707 A1 | | 8/2003 | Hauser |
| 2006/0249135 A1 | * | 11/2006 | Matsumoto ........... B28D 5/045 |
| | | | 125/21 |

FOREIGN PATENT DOCUMENTS

| | | |
|---|---|---|
| JP | 2010212467 | 9/2010 |
| KR | 100244108 | 3/2000 |

* cited by examiner

WIRE SAW

BACKGROUND

The present invention relates, in general, to a wire saw for cutting a ceramic or single crystal ingot and, more particularly, to a wire saw for cutting an ingot into a plurality of thin wafers by swinging the ingot with respect to a running wire.

BACKGROUND ART

In general, as a machine for cutting a ceramic ingot or single crystal ingot formed of GaAs, GaP, InP, quartz, or sapphire into multiple thin wafers, a wire saw is widely used due to a high yield of production per hour. The wire saw is a machine that fundamentally cuts the ingot based on an interaction of an abrasive such as diamond with a piano steel wire or a stainless steel wire having a diameter of 1 mm or less, preferably about 200 μm.

In cutting the ingot using the wire saw, there is a need for process conditions capable of restricting deflection of the wire to the minimum and minimizing a length at which the wire comes into contact with the ingot in the ingot cutting process (hereinafter referred to as a "contact length"). Particularly, a high-speed, high-precision cutting technique is required to cope with a high hardness ingot such as a sapphire ingot and a trend to an increased ingot size in order to reduce semiconductor process costs With regard to an improvement in ingot cutting performance and the high-speed, high-precision cutting technique, U.S. Pat. No. 4,646,710 discloses a wire saw (hereinafter referred to as "Related Art 1") designed to dispose diamond cutting wires on two guide rollers, reciprocally move the wires at a high speed, swing an ingot with the ingot fixed to an ingot holder, and cut the ingot into thin wafers. As suggested in Related Art 1, when a contact length is reduced, an applied pressure between the ingot and the wire is increased to improve the cutting performance, and the wire is reduced in deflection and the resultant rocking. As such, it is known that high-speed, high-precision cutting is possible.

In general, the contact length of the wire is dependent on various conditions such as deflection of the wire, a distance between supporting points of the wire, a cutting load, a running speed of the wire, a feed speed of the ingot, and a shape or size of a diamond abrasive. As can be seen from Related Art 1, when the ingot is swung, a radius of curvature and a contact length of an ingot cut profile may be changed depending on swing conditions. As such, a process of cutting the ingot while the ingot is swung is very useful as a method capable of reducing the contact length and improving the cutting performance.

Further, according to Related Art 1, a relation of the deflection of the wire, and the radius of curvature and the contact length of the ingot cut profile is given by Equation 1 below.

$$B \cong 2R \cdot \tan^{-1}(D/L)/57.296 \qquad \text{Equation 1}$$

where B is the contact length, R is the radius of curvature of the ingot cut profile, D is the deflection of the wire, and L is equal to ½ the distance between the two guide rollers supporting the wire. When the contact length is given from Equation 1, the radius R of curvature is 28.648 B/tan$^{-1}$(D/L), but a real radius of curvature should be less than or equal to this value.

Meanwhile, when the ingot is swung, the radius of curvature of the ingot cut profile varies depending on a distance between a swing central axis and a cut point. For example, when a square ingot whose cutting plane has a width of c is swung at an acute angle less than 90 degrees and is cut at a radius R of curvature, and when a vertical distance from a junction, at which the radius R of curvature coming into contact with an upper end of the ingot interests with the side of the ingot, to the upper end of the ingot is h, the radius R of curvature is given in a geometrical relation as Equation 2 below.

$$R=(c^2+4h^2)/8h \qquad \text{Equation 2}$$

In this way, it is very desirable to swing at a large angle at the center of the ingot because the contact length is minimized. However, there is a problem in that the ingot holder fixing the ingot comes into contact with and interferes with the wire and/or the guide rollers, or a swing space of the ingot holder should be secured. As such, the swing angle at the center of the ingot has no alternative but to be limited. However, to cut the ingot with the contact length close to a point contact to form an arc-shaped cut profile, an ingot cut point (i.e. a point at which the ingot comes into contact with the wire and is cut) should be present within a swing angle range indicated by the swing angle. If the ingot cut point deviates from the swing angle range, the wire comes into line contact with the ingot, and a linear cut profile is formed, which is undesirable because cut resistance is increased, and because cuttability is reduced. Thus, to form an arc-shaped cut profile with the contact length approximating the point contact over the overall region of the cutting plane of the ingot, the cut point should be present within the swing angle range indicated by the swing angle. Therefore, in the ingot swing mechanism, the ingot swing angle is inevitably limited, but it is desirable to make the ingot swing angle as large as possible.

Meanwhile, when the swing space of the ingot holder is secured or the distance between the guide rollers is increased in the relation between the swing axis and the swing angle of the ingot, the wire deflection D is increased although the ingot is cut with the same wire and the same cutting load. As the wire deflection D increases, the contact length increases, and the cuttability is reduced. Accordingly, there is a need for a method of minimizing the distance between the guide rollers along with the swing of the ingot. As an example of the method, in Japanese Patent No. 3,539,773 (referred to as "Related Art 2") and U.S. Pat. No. 6,886,550 (referred to as "Related Art 3), a method capable of reducing interference with the guide rollers while the ingot is swung is suggested. Related Art 1 is designed to combine two translation mechanisms reciprocating left and right to cause the ingot cut point to be located at a fixed position with respect to the guide rollers at all times. To this end, one fixed point (hereinafter referred to as a "vibration point") serving as the center of the swing should be formed by the two translation mechanisms. If one vibration point is not formed, the cut point is not located at the fixed position with respect to the guide rollers. Related Art 1 will be more clearly understood compared to Related Art 2, and the translation mechanism and rotation mechanism only have a difference in rotating means, and are identical to each other in terms of structure. Thus, in Related Arts 1 and 2, when the ingot is swung at an angle of α in an ingot swing unit 9, a lifting block moves (1−cos α). When the ingot is swung once, the lifting block moves twice, i.e. repeats upward and downward movements. The swing unit disclosed in Related Arts 1 and 2 is configured by a combination of the translation mechanism, the rotation mechanism, and a lifting mechanism. Further, in the swing unit disclosed in Related Arts 1 and 2, when the vibration point is present at the center of the ingot, there is no horizontal movement of the ingot. As such, a limitation to the swing space is reduced, and the distance between the guide rollers is reduced, which is most ideal.

However, the wire saw generally has a problem in that the lifting block should be transferred at a fixed rate in proportion to a cutting depth of the ingot. Since the lifting block has weight of 1 ton or more, and since a transfer load according to a hysteresis characteristic varies during lifting and lowering cycles of the lifting block, it is desirable to lower the lifting block at a fixed rate by the cutting depth, and to avoid lifting the lifting block as far as possible. However, in the wire saw according to Related Arts 2 and 3, since the swing unit includes a lifting mode of the lifting block as well as the lifting and lowering cycles, there is a problem in that it is difficult to control the swing unit, and the swing unit has a low precision and a long process time. Furthermore, since the lifting block cannot move far, an amount of movement of $(1-\cos \alpha)$ is small, and the swing angle $\alpha$ cannot be increased. As such, there is a problem in that a radius of rotation of the ingot holder is increased, and the machine is inefficiently oversized as a whole. Further, since many mechanisms and control variables are required to control the swing, the control is complicated, and many components lead to a complicated structure. Thus, cost required to produce the machine is increased.

SUMMARY OF THE INVENTION

Accordingly, the present invention has been made keeping in mind the above problems occurring in the related art, and the present invention is intended to propose a wire saw capable of minimizing a distance between guide rollers and swinging an ingot to improve cut performance of the ingot.

TECHNICAL SOLUTION

In order to achieve the object of the present invention, according to an aspect of the present invention, there is provided a wire saw, which includes: first and second driving blocks moving in a direction perpendicular to each other; an ingot holder coupled to the first and second driving blocks so as to be able to be swung according to the movement of one of the first and second driving blocks; and a lifting block transferring the ingot holder in parallel with a direction in which an ingot is cut.

In the wire saw according to the present invention, the ingot holder may be disposed between the first driving block and the second driving block. The first driving block may move in parallel with a direction in which a wire runs, and the second driving block may move in parallel with the direction in which the ingot is cut.

In the wire saw according to the present invention, the ingot holder may be coupled with at least one of the first driving block and the second driving block by a pivot shaft.

In the wire saw according to the present invention, the ingot holder may be coupled with the first driving block by a first pivot shaft, and be coupled with the second driving block by a second pivot shaft. A distance between the first pivot shaft and the second pivot shaft may be kept constant during swinging of the ingot.

Furthermore, in the wire saw according to the present invention, the first pivot shaft and the second pivot shaft may be translated in a direction perpendicular to each other during swinging of the ingot holder.

In the wire saw according to the present invention, a distance to which one of the first pivot shaft and the second pivot shaft moves in parallel with a direction in which a wire runs may meet Equation 3 below:

$$Sy = L \cdot \sin \alpha \qquad \text{Equation 3}$$

Where $Sy$ is the moving distance, $L$ is the distance between the center of the first pivot shaft and the center of the second pivot shaft, and $\alpha$ is the angle at which the ingot holder is swung.

According to another aspect of the present invention, there is provided a wire saw, which includes: a first driving block moving in parallel with a direction in which a wire runs; an ingot holder coupled with the first driving block by a pivot shaft; and a second driving block installed on the ingot holder so as to be able to move in parallel with a direction in which an ingot is cut according to the movement of the first driving block and to allow the ingot holder to be swung around the pivot shaft.

According to yet another aspect of the present invention, there is provided a wire saw, which includes: an ingot holder holding an ingot; and first and second pivot shafts installed on the ingot holder so as to allow the ingot holder to be rotated about first and second rotary central lines. The first pivot shaft and the second pivot shaft move in a direction perpendicular to each other so as to cause the ingot holder to be swung.

According to still yet another aspect of the present invention, there is provided a wire saw, which includes: at least two guide rollers installed on a frame to guide a wire running in one or opposite directions; a lifting block installed on the frame so as to be lifted in parallel with a direction in which an ingot is cut; a first driving block installed on the frame or the lifting block so as to be movable in parallel with the direction in which the wire runs; a second driving block installed on the frame or the lifting block so as to be movable in parallel with the direction in which the ingot is cut; and an ingot holder coupled with the first and second driving blocks so as to be able to be swung according to movement of a first part of one of the first and second driving blocks.

Furthermore, the wire saw according to the present invention may include: first rails provided for the lifting block in parallel with the direction in which the wire runs; a second rail provided for the frame or the lifting block in parallel with the direction in which the ingot is cut; first slide guides mounted on the first driving block so as to be movable along the first rails; and a second slide guide mounted on the second driving block so as to be movable along the second rail. Here, the first and second rails may be projected or recessed in a channel shape so as to allow the first and second slide guides to be movably guided.

Advantageous Effects

With this configuration, the ingot can be swung without translating left and right in the running direction of the wire regardless of the movement of the lifting block, and the swing and translation of the ingot can be avoided by one driving block. As such, a structure and control of the wire saw are simplified.

BRIEF DESCRIPTION OF DRAWINGS

FIG. 9 is a view for describing an ingot swing in the wire saw as shown in FIG. 8 in the present invention, wherein FIG. 9(a) is a cross-sectional view showing a state in which the ingot is swung along the wire in a rightward direction, FIG. 9(b) is a cross-sectional view showing a state in which the ingot is located in the center, and FIG. 9(c) is a cross-sectional view showing a state in which the ingot is swung along the wire in a leftward direction.

<Lists of symbols used for main parts of the drawings>

| | |
|---|---|
| I: Ingot | R1, R2: guide roller |
| 1: wire saw | 3: frame |
| 5: cutting unit | 7: lifting unit |
| 9: swing unit | 31: base frame |
| 33: column | 35: lifting guide rail |
| 37: feed screw | 39: feed motor |
| 51: wire | 60: wire feed mechanism |
| 71: sliding block | 73: lifting block |
| 80: swing frame | 82: first rail |
| 85: side table | 86: second rail |
| 100: first driving block | 103: first slide guide |
| 110: second driving block | 113: second slide guide |
| 120: ingot holder | 121: ingot mount |
| 123: rotary arm | 124: first pivot shaft |
| 125: second pivot shaft | 140: swing motor |
| 144: pinion | 146: rack |
| 160: fixing unit | 161: work plate |
| 163: dummy beam | |

DETAILED DESCRIPTION OF THE INVENTION

A wire saw to which a swing unit is applied in accordance with the present invention will be described. The term "cutting plane" used herein refers to a plane on which an ingot is cut by a wire, which is parallel with a cutting direction of the ingot, and which is orthogonal to a running direction of a wire. Further, the cutting direction of the ingot is a z-axial direction, the running direction of the wire is a y-axial direction, and the direction orthogonal to the cutting plane is an x-axial direction. The left side or the right side refers to the left side or the right side on the basis of the y-axial direction. The upper side or the lower side refers to the upper side or the lower side on the basis of the z-axial direction. The front or the rear refers to the front or the rear on the basis of the x-axial direction.

A wire saw according to an exemplary embodiment of the present invention will be described with reference to the attached drawings.

Figure 1:
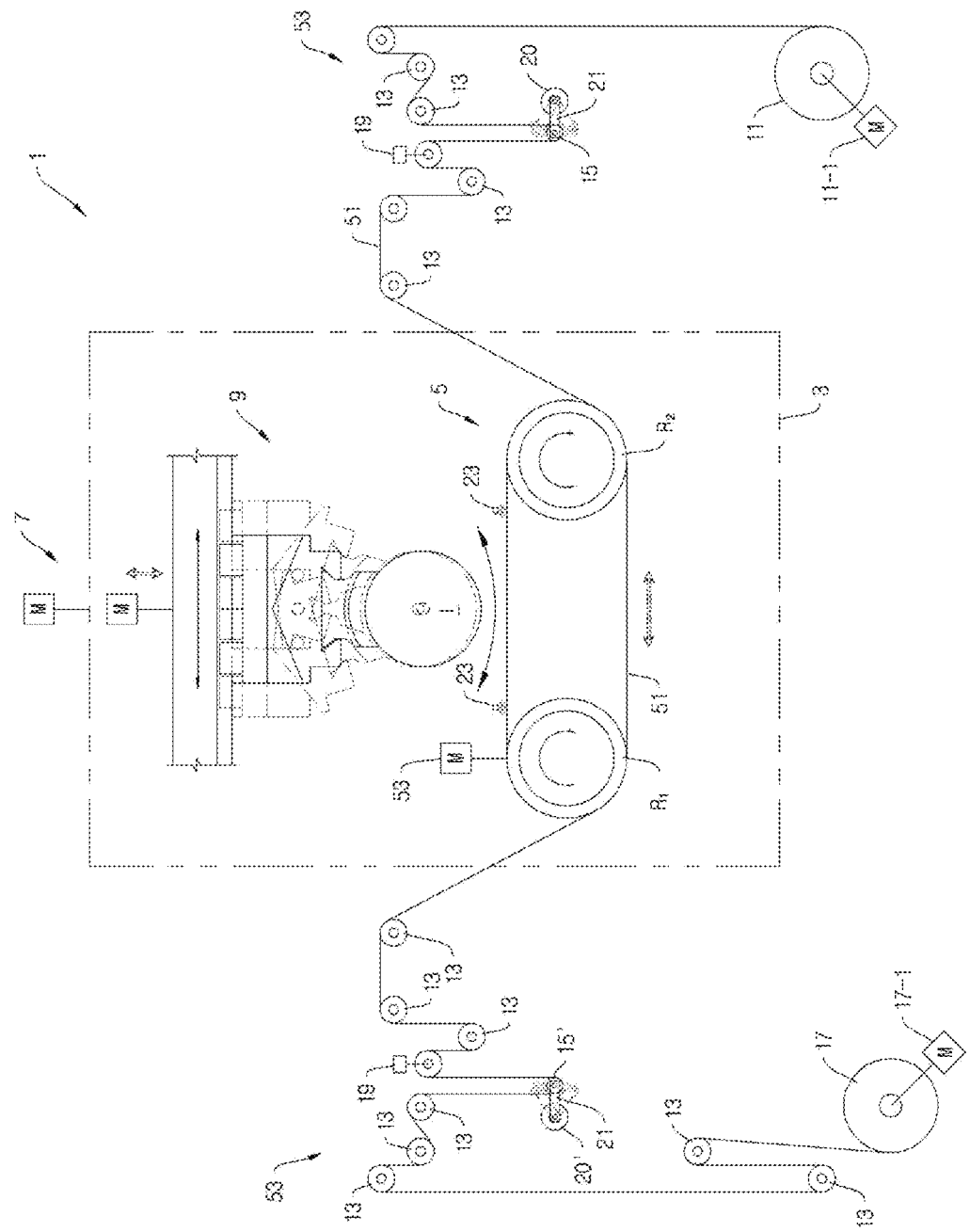
FIG. 1 is a front view schematically showing an overall configuration a wire saw to which a swing unit is applied in accordance with the present invention.

FIG. 1 is a front view schematically showing an overall configuration a wire saw to which a swing unit is applied in accordance with the present invention.

Referring to FIG. 1, the wire saw 1 includes a cutting unit 5, a lifting unit 7, and a swing unit 9, all of which are installed on a frame 3. Here, excluding the swing unit 9 and the lifting unit 7, the wire saw 1 is equal to a conventional wire saw.

The cutting unit 5 includes guide rollers R1 and R2, a wire 51, and a motor 50. The guide rollers R1 and R2 are provided in a pair, are installed on the frame 3 parallel to each other, and are driven by the motor 50. Each guide roller is preferably provided with guide grooves (not shown) in an outer circumferential surface thereof, because the wire 51 is smoothly guided to a cutting region.

Each wire feed mechanism 60 includes a feed bobbin 11, guide pulleys 13, tension pulleys 15, and a take-up bobbin 17. The wire 51 is wound around the feed bobbin 11 at a length of 50 to 100 km, and is unwound from the feed bobbin 11 by a motor 11-1. Then, the wire 51 passes through the numerous guide pulleys 13, the tension pulleys 15, and the guide pulley to which a load cell 19 for measuring a tension is attached, and is sequentially wound around the guide grooves of the guide rollers R1 and R2, thereby forming a line. Subsequently, the wire 51 passes through the guide pulleys 13, the guide pulley to which the load cell 19 for measuring the tension is attached, and the tension pulleys 15', and is wound around the take-up bobbin 17 rotated by a motor 17-1. The tension pulleys 15 and 15' are shaken by motors 20 and 20' in which tension arms 21 and encoders are housed. Thereby, the wire 51 can be wound around the guide rollers R1 and R2 with a constant tension. Such a wire feed mechanism 60 is controlled by a control unit (not shown). To cut an ingot, the wire 51 runs between the guide rollers R1 and R2 in one direction or in opposite directions with a constant tension at a speed of 300 to 1200 m/min, and the ingot is fed to the running wire 51. Thereby, the ingot is cut into wafers at a thickness corresponding to an interval between the guide grooves.

The wire 51 may include a piano wire having a content of carbon of 0.8 to 0.9 wt % and a diameter of 80 to 180 μm. An abrasive such as diamond may be electrodeposited on the wire 51 so as to be directly attached to the wire 51, or be supplied to the wire 51 in a slurry form along with a cutting fluid for cooling the wire. Here, the cutting fluid uses water as a principal component, or may use a mixture of water and a cutting agent known in the related art. The cutting fluid is supplied to the wire 51 through a nozzle 23 and a pipe (not shown) having a solenoid valve by a pump (not shown).

Figure 2:
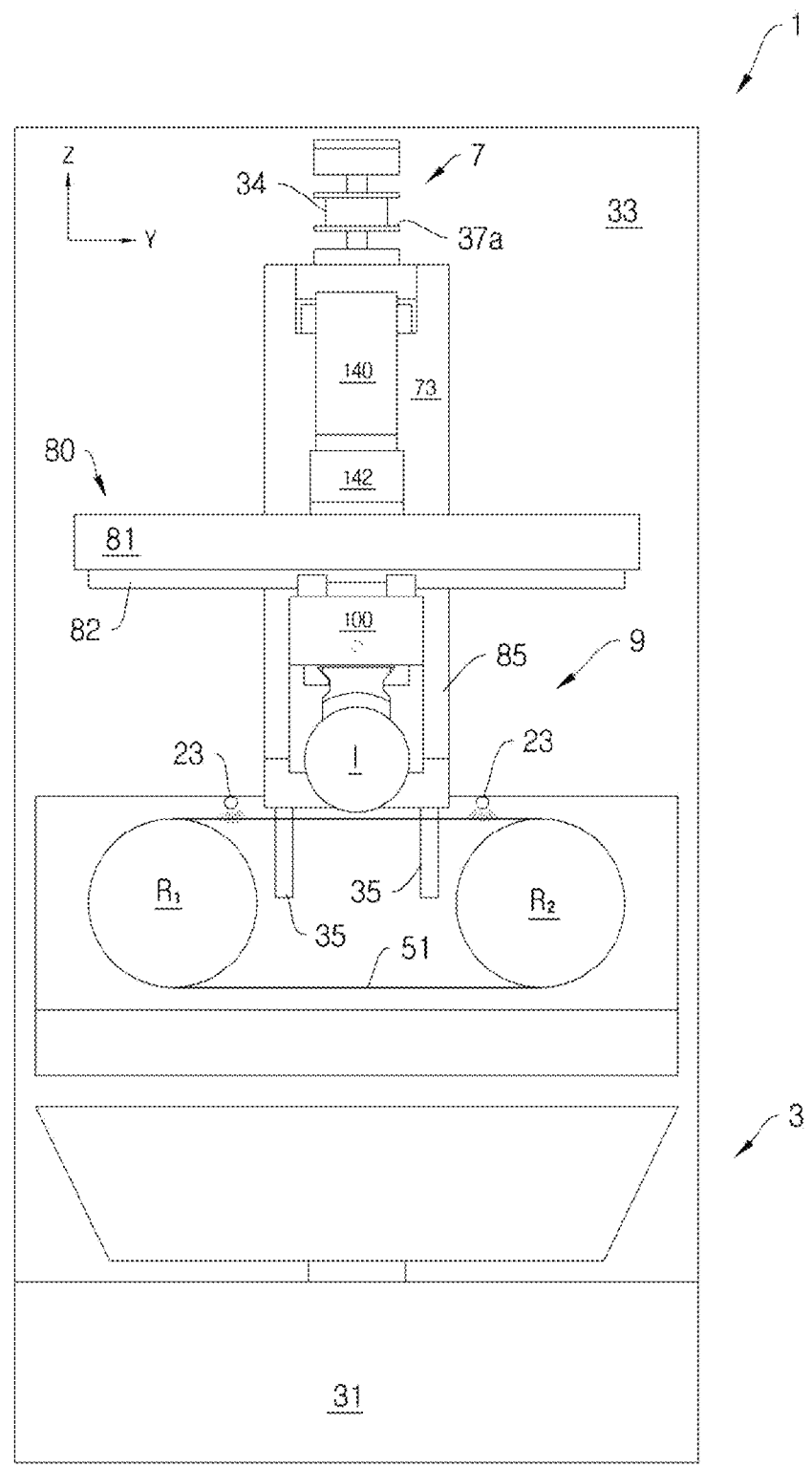
FIG. 2 is a front view showing the wire saw to which the swing unit is applied in greater detail in accordance with the present invention.
Figure 3:
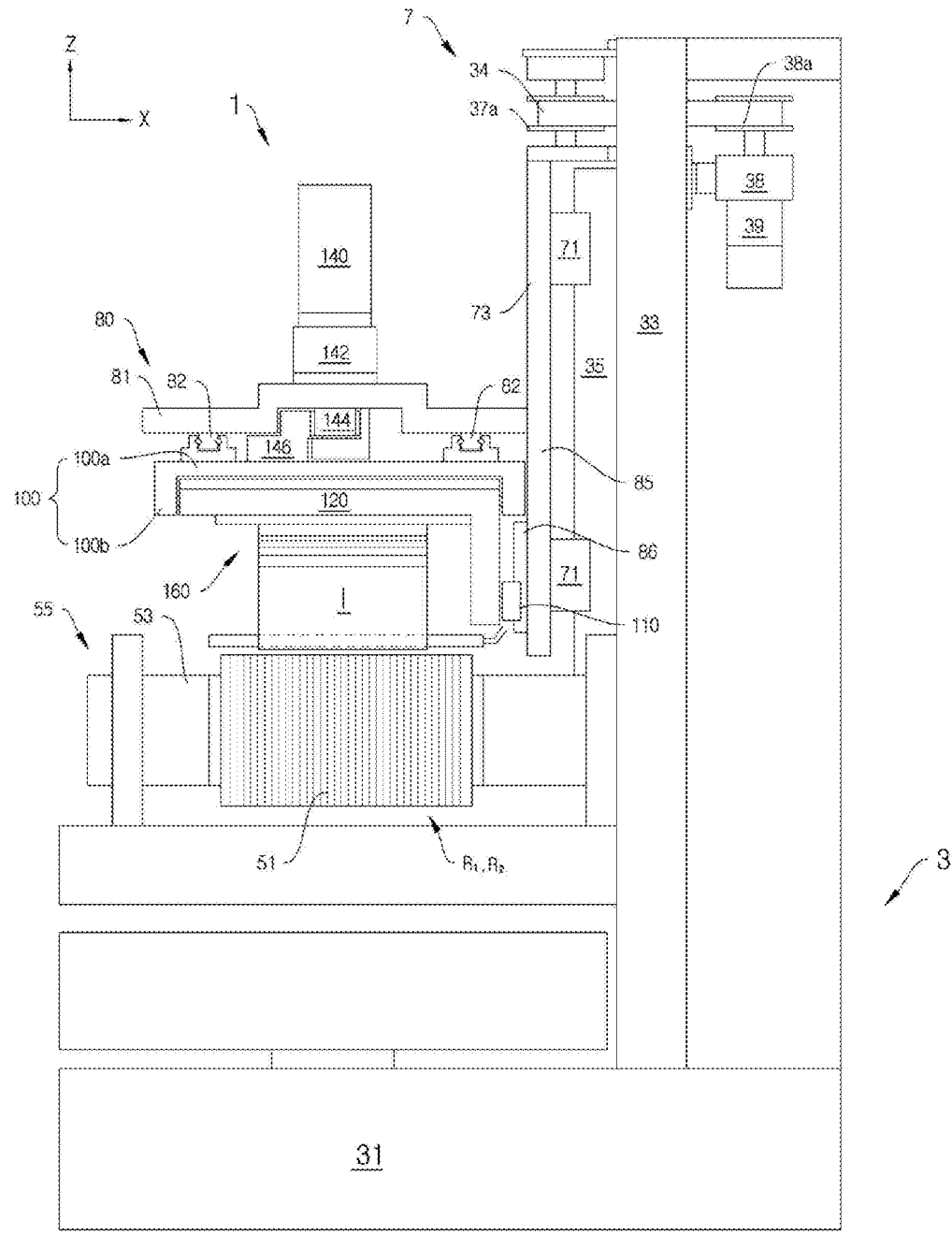
FIG. 3 is a side view showing the wire saw to which the swing unit is applied accordance with the present invention.

FIG. 2 is a front view showing the wire saw to which the swing unit is applied in greater detail in accordance with the present invention. FIG. 3 is a side view showing the wire saw to which the swing unit is applied accordance with the present invention.

Referring to FIGS. 2 and 3, the frame 3 includes a base frame 31 on which the guide rollers R1 and R2 are mounted, and a column 33 protruding upward from the base frame 31. Spindles 53 of the guide rollers R1 and R2 are supported on the base frame 31 by bearings 55. The column 33 is provided with two lifting rails 35 disposed in the z-axial direction (cutting direction of the ingot) so as to allow the lifting unit 7 to move to cut the ingot, and a lifting motor 39 connected to a speed reducer 38 to transmit a force to a feed screw 37 (see FIG. 4). A driving pulley 38*a* is mounted on an end of a shaft of the speed reducer 38, and a driven pulley 37*a* is mounted on an end of the feed screw 37 (see FIG. 4). Further, a timing belt 34 is wound around the driving pulley 38*a* and the driven pulley 37*a* as a force transmitting means.

The lifting unit 7 includes slide guides 71 and a lifting block 73, and is installed on a swing frame 80. The four slide guides 71 serve as one set, and are integrally installed on the lifting block 73 so as to be able to move on the lifting rails 35 in a vertical direction. The feed screw 37 is installed on the lifting block 73 so as to allow the lifting block 73 to move in the z-axial direction. Here, the slide guides 71 may be bearing guides that are fitted into dovetail grooves so as to slide on the lifting rails 35 or that have rolling bearings to be caused to move on the lifting rails 35 without a stick slide phenomenon (see FIG. 6), or may have various shapes and structures or combinations thereof known and used in the related art to which the present invention belongs.

The swing frame 80 is shown as an exemplary example for carrying out the swing unit 9 according to the present invention, and it is apparent that a shape and structure of the swing frame 80 can also be changed depending on a configuration and structure of the swing unit 9. However, the swing unit 9 to be installed on a lower side of the swing frame 80 as the exemplary example for carrying out the swing unit 9 according to the present invention, and the swing frame 80 is open so as to provide a swing space, and has an L-shaped cross section as a whole including a base table 81 and a side table 85.

The base table 81 protrudes forward from the lifting block 73 in a bent shape, and is provided with two first rails 82 on a bottom thereof in the y-axial direction. A swing motor 140 connected to a speed reducer 142 is installed on the base table, and a pinion 144 is provided for an output end of the speed reducer 142.

The side table 85 protrudes downward from the lifting block 73, and is provided with a second rail 86 in the front thereof in the z-axial direction. The swing unit 9 is mounted on such a swing frame 80. When the lifting motor 39 is driven by the control unit (not shown), the swing unit 9 is displaced together by rotation of the feed screw 37 and vertical movement of the lifting unit 7.

Figure 4:
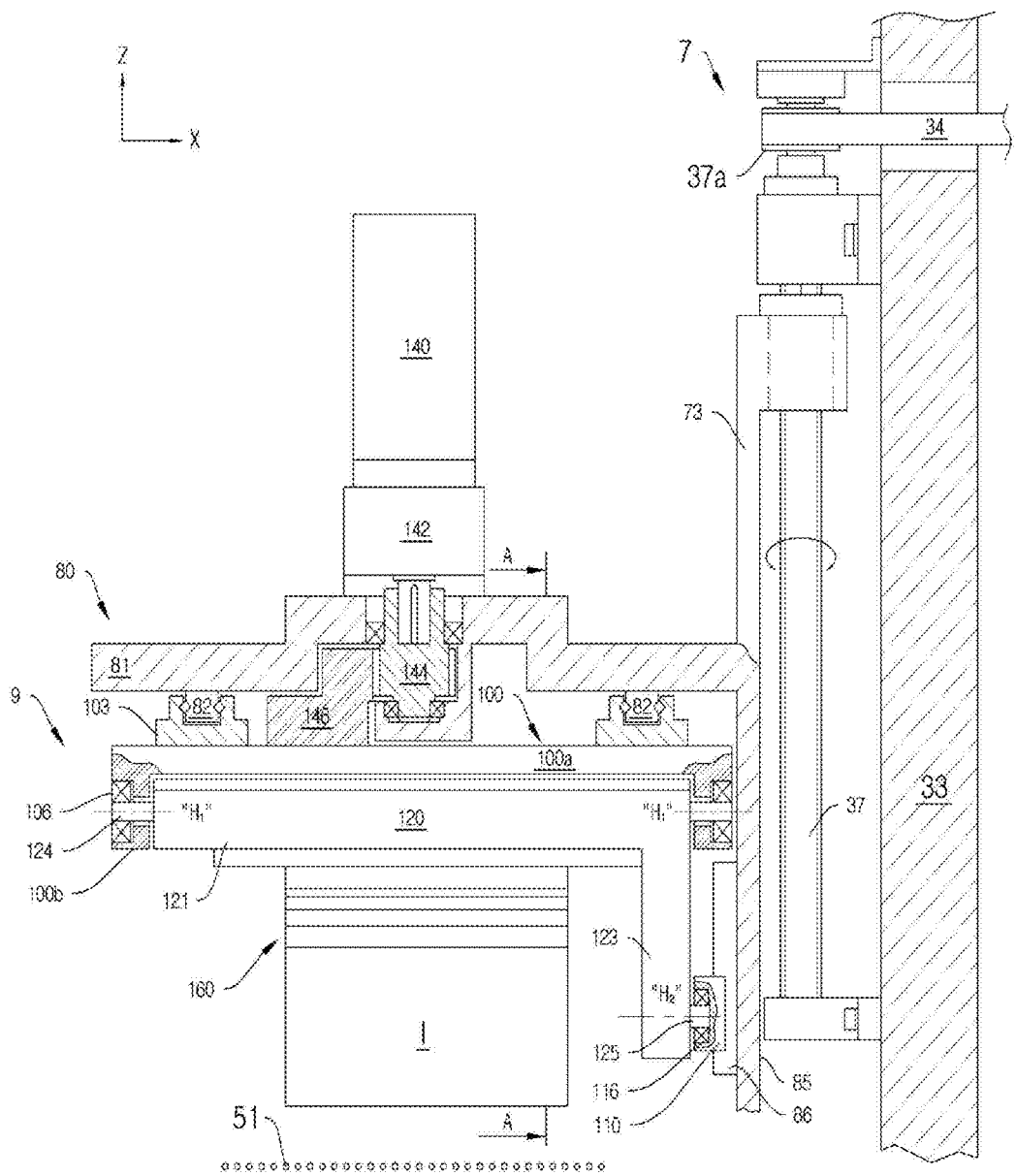
FIG. 4 is a partial cross-sectional view showing the wire saw to which the swing unit is applied in accordance with the present invention.

FIG. 4 is a partial cross-sectional view showing the wire saw to which the swing unit is applied in accordance with the present invention.

Referring to FIGS. 3 and 4, the swing unit 9 according to one aspect of the present invention includes first and second driving blocks 100 and 110 moving in a perpendicular to each other, and an ingot holder 120 connected to the first and second driving blocks 100 and 110 so as to be able to swing according to movement of at least one of the first and second driving blocks 100 and 110. Further, the swing unit 9 according to another aspect of the present invention may include a first driving block 100 moving in parallel with the running direction of the wire 51, an ingot holder 120 is coupled with the first driving block 100 by a pivot shaft 124, and a second driving block 110 installed on the ingot holder 120 so as to be able to move in parallel with the cutting direction of the ingot according to the movement of the first driving block 100 and simultaneously allow the ingot holder 120 to swing. Furthermore, the wire saw 1 according to yet another aspect of the present invention may include an ingot holder 120 holding the ingot I, and first and second pivot shafts 124 and 125 so that the ingot holder 120 can be rotated about first and second rotation lines $H_1$ and $H_2$, and the first and second pivot shafts 124 and 125 move in a direction perpendicular to each other so that the ingot holder 120 is caused to swing. In this way, the swing unit according to the present invention may have various embodiments and modifications. However, as an exemplary embodiment, for specific and detailed description and convenience of description and understanding, the swing frame 80 or the swing unit 9 will be shown and described as a unit part or portion.

Referring to FIGS. 3 and 4, the first driving block 100 includes a body block 100*a* and a wing block 100*b*, and has a stretched C-shaped cross section bent downward at opposite ends thereof as a whole.

Figure 5:
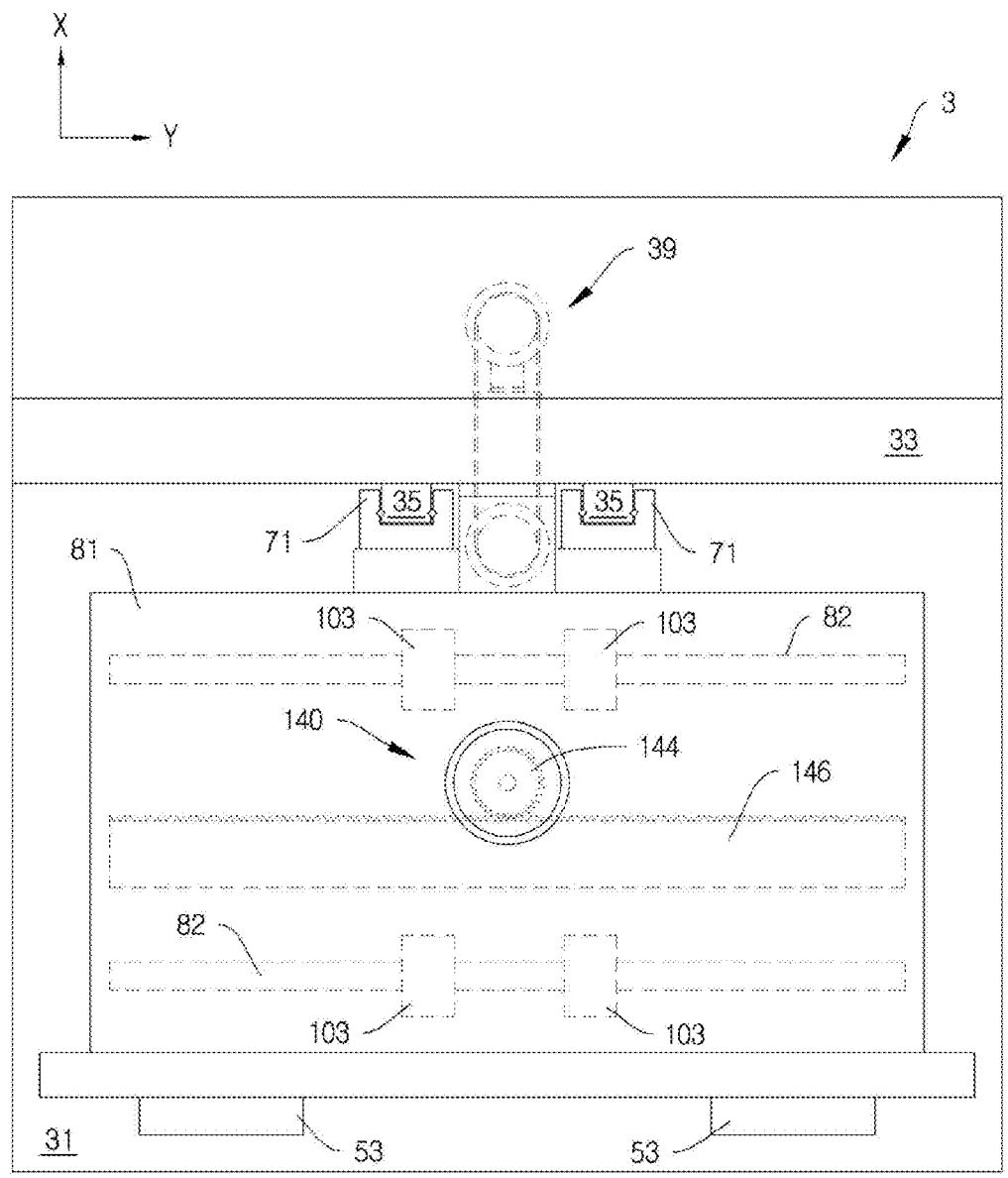
FIG. 5 is a top-down view showing the wire saw to which the swing unit is applied in accordance with the present invention.

FIG. 5 is a top-down view showing the wire saw to which the swing unit is applied in accordance with the present invention.

Referring to FIGS. 4 and 5, four first slide guides 103 are installed on the top of the body block 100*a*, and are fitted into the first rails 82 so as to be movable in the y-axial direction. A rack 146 is installed on the middle of the top of the body block 100*a*, and cooperates with the pinion 144 so as to be movable in the y-axial direction. Thus, when the swing motor 140 is driven, the rack 146 engaged with the pinion 144 moves in the y-axial direction. Thereby, the first slide guides 103 moves along the first rails 82, and the first driving block 100 can move on the base table 81 in the y-axial direction. In the shown example, the cooperation of the rack 146 and the pinion 144 allows the first driving block 100 to move in the running direction (y-axial direction) of the wire. The first driving block 100 may have more various structures, for instance have a combination of the belt 34 and the feed screw 37 for the movement of the lifting block 73 described with reference to FIG. 4. It is apparent to those skilled in the art that the first driving block 100 may have various shapes or structures known in the related art to which the present invention falls and combinations thereof.

Figure 6:
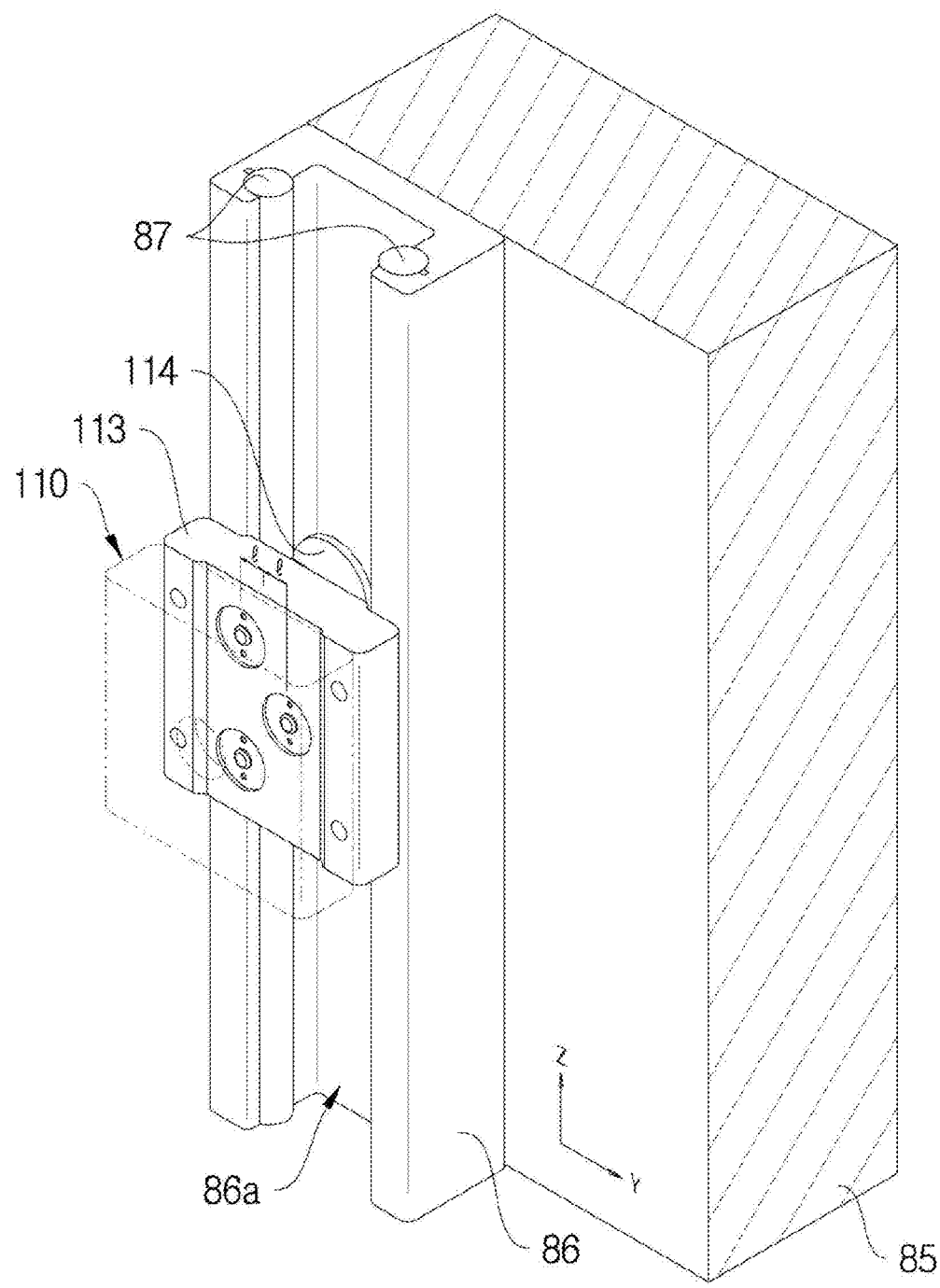
FIG. 6 is a perspective view showing the slide guide as an example that can be applied to the swing unit in accordance with the present invention.

FIG. 6 is a perspective view showing the slide guide as an example that can be applied to the swing unit in accordance with the present invention.

Referring to FIGS. 4 and 6, a second slide guide 113 is integrally fixed to the second driving block 110. Three rollers 114 are supported on the second slide guide 113 by bearings (not shown) so as to be rotatable. The rollers 114 have a pulley shape, and are offset in such a manner that axes thereof are placed away from each other by a distance e in the z-axial direction.

The second rail 86 is provided with a channel 86*a* in which the rollers 114 are housed to be moveable in the z-axial direction. Cylindrical side rails 87 are fixedly installed on opposite inner walls of the second rail 86 in the z-axial direction. With this configuration, the rollers 114 roll on the side rails 87, and the second slide guide 113 and the second driving block 110 can move in the z-axial direction. Here, the example in which the second slide guide 113 and the second rail 86 allow the second driving block to move in the z-axial direction has been described with reference to FIG. 6. Further, as described above, the second slide guide 113 may have various shapes and structures known or implemented in the related art to which the present invention belongs like the bearing guide that is fitted into the dovetail groove so as to slide on the second rail 86 or that has the rolling bearing to be caused to move on the second rail 86 without a stick slide phenomenon. Further, as a modification, the second slide guide 113 integrally formed with the second driving block 110 may be changed in shape and be housed in the channel 86*a* of the second rail 86 without the rollers 114 so as to be movable in the z-axial direction. This configuration is apparent to those skilled in the art.

Figure 7:
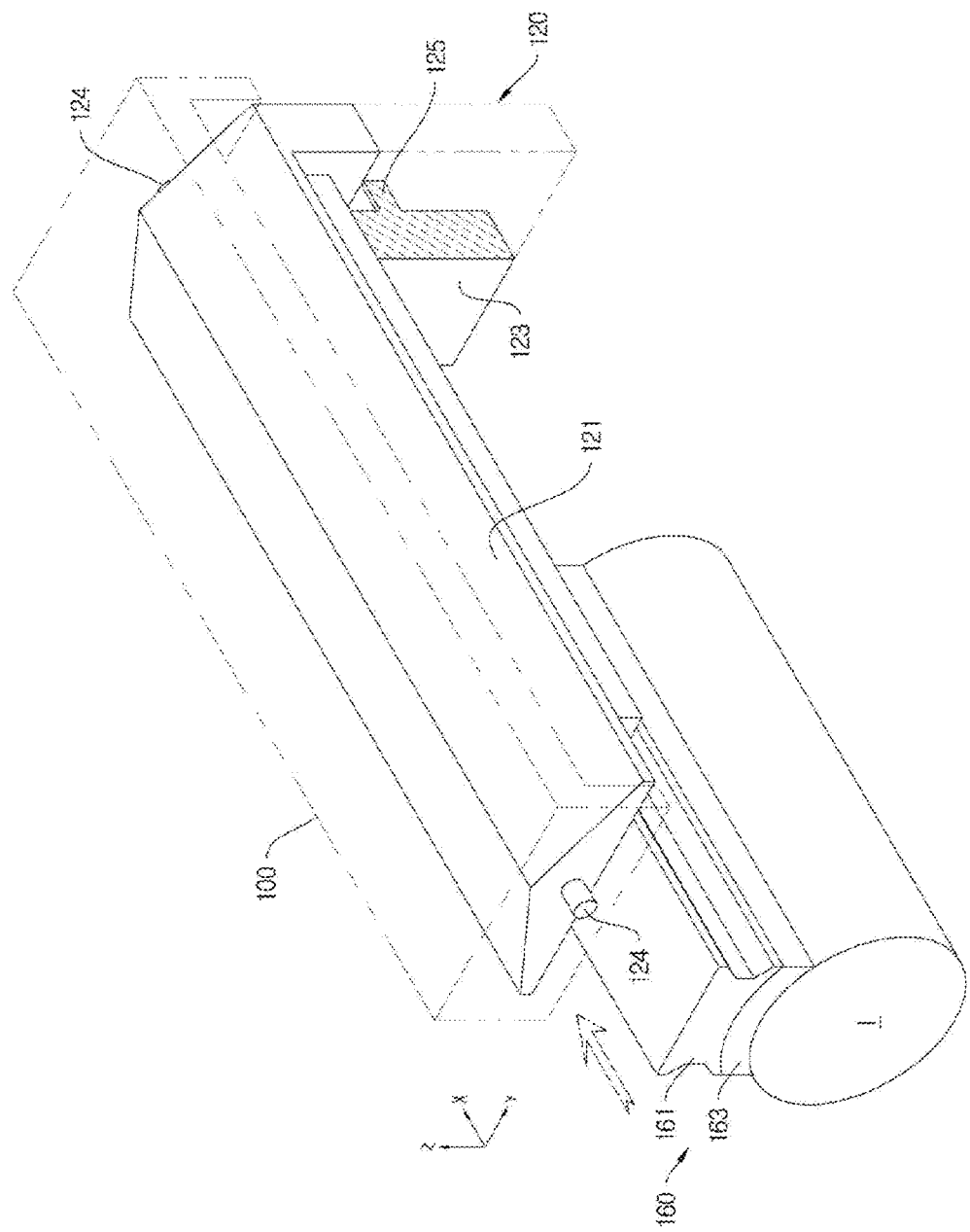
FIG. 7 is a partly disassembled perspective view showing the ingot holder as an example that can be applied to the swing unit in accordance with the present invention.

FIG. 7 is a partly disassembled perspective view showing the ingot holder as an example that can be applied to the swing unit in accordance with the present invention.

Referring to FIGS. 4 and 7, the ingot holder 120 includes an ingot mount 121 and a rotary arm 123, and has an L-shaped cross section as a whole. Here, the ingot holder 120 is rotated about two rotary central lines $H_1$ and $H_2$. The rotary central lines $H_1$ and $H_2$ are virtual lines connecting rotary central points. The two rotary central lines $H_1$ and $H_2$ are perpendicular to the cutting plane, and are parallel to each other so that a distance therebetween is kept constant. Further, when pivot shafts 124 and 125 are provided on the respective rotary central lines $H_1$ and $H_2$, the ingot holder 120 can be rotated about the rotary central lines $H_1$ and $H_2$ or about the pivot shafts 124 and 125. In the shown example, the ingot holder 120 is disposed between the first driving block 100 and the second driving block 110, and the first pivot shaft 124 is integrally attached to opposite ends of the ingot mount, and is installed on the first driving block 100, i.e. the wing block 100b, via bearings 106. Further, the second pivot shaft 125 is integrally attached to the rotary arm 123, and is installed on the second driving block 110 via a bearing 116.

Figure 8:
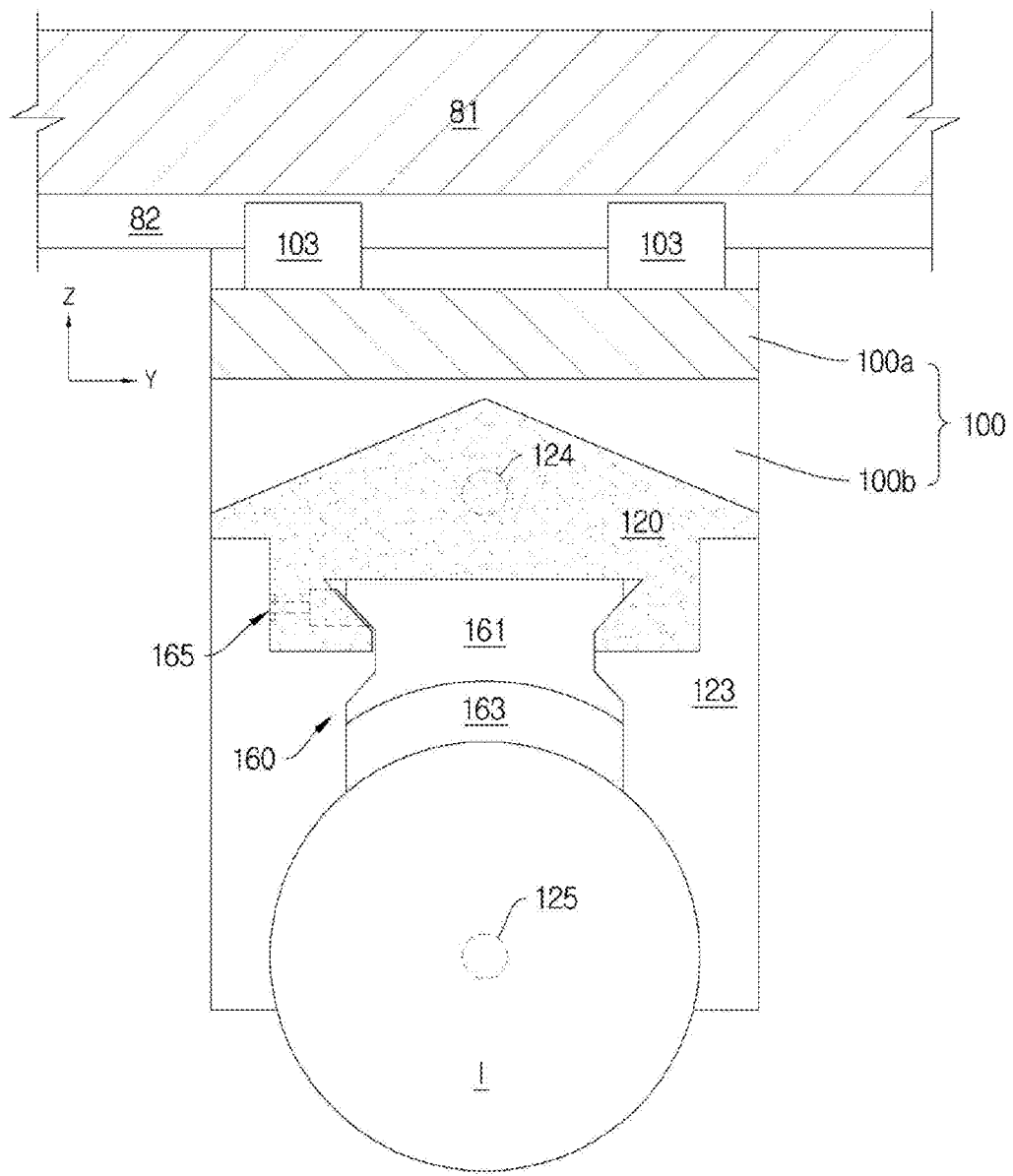
FIG. 8 is a cross-sectional view showing the wire saw according to the present invention and taken along line A-A of FIG. 4.

FIG. 8 is a cross-sectional view showing the wire saw according to the present invention and taken along line A-A of FIG. 4.

Referring to FIGS. 4 and 8, when the first driving block 100 moves, the second driving block 110 moves up and down, and simultaneously the ingot holder 120 is swung. In detail, the ingot holder 120 is integrally attached to the first and second pivot shafts 124 and 125. When the first driving block 100 moves, the first pivot shaft 124 is rotated about the first rotary central line $H_1$, and simultaneously is translated in the y-axial direction along with the first driving block 100. Further, the second pivot shaft 125 is rotated about the second rotary central line $H_2$, and is simultaneously translated in the y-axial direction along with the second driving block 110. Thus, the ingot holder 120 swings the ingot I using the first pivot shaft 124 as a swing central axis and using a distance between the first pivot shaft 124 and the wire 51 as a swing radius. In this case, the second pivot shaft 125 is translated only in the z-axial direction, and one pivotal point is formed in the center of the second pivot shaft 125 translated only in the z-axial direction. When the pivotal point is located in the center of the ingot I, the ingot I can be swung only with the vertical movement without the horizontal movement on the cutting plane. Here, as an example in which at least one of the first driving block 100 and the second driving block 110 moves, and thereby the ingot holder 120 is swung, an example in which the first driving block 100 moves is shown. An example in which the two pivot shafts 124 and 125 coupled with the ingot holder 120 are rotated and translated, and thereby the ingot holder 120 is swung is shown. Alternatively, the pivot shafts 124 and 125 may be integrally attached to the driving blocks 100 and 110, and be coupled with the ingot holder 120 via the bearings, or one of the two pivot shafts 124 and 125 may be integrally coupled to the ingot holder 120, and the other may be integrally coupled to one of the driving blocks 100 and 110. The ingot holder 120 may be coupled with the driving blocks 100 and 110 via the bearing. These various structures are apparent to those skilled in the art, and various shapes or structures known in the related art to which the present invention falls are possible and apparent. Further, the ingot holder 120 having the L-shaped cross section has been described as an example of the ingot holder 120. However, the shape and structure in which the ingot holder 120 can be swung by the driving blocks 100 and 110 moving in the direction perpendicular to each other or the pivot shafts 124 and 125 are not specifically limited. Thus, various modifications thereof may be made, let alone the various shapes or structures known in the related art to which the present invention falls, and are apparent to those skilled in the art.

The ingot holder 120 fixedly holds the ingot I in the process of cutting the ingot I. As a technique for firmly holding the ingot I with respect to the wire 51, it is preferable to further provide an ingot fixing unit 160.

Referring to FIGS. 7 and 8, for the ingot fixing unit 160, a work plate 161 and a dummy beam 163 may be used. The work plate 161 serves to fix the ingot I attached to the dummy beam 163 to the ingot mount 121. The dummy beam 163 serves to hold thin wafers into which the ingot I is cut. As known in the related art, the dummy beam 163 may be formed of a material such as glass, carbon, a synthetic resin, or ceramic, and be adhered to the work plate 161 and the ingot I by an adhesive based on wax or epoxy. The work plate 161 is fixed to the ingot mount 121. In the shown example, as known in the related art, the dovetail formed on the work plate 161 and the dovetail groove formed in the ingot mount 121 are paired and joined, and the dovetail is pressed and fixed to the dovetail groove by bolts 165. The work plate 161 may be coupled to the ingot mount 121 by another hydraulic device known in the related art.

Hereinafter, an ingot cutting process that is associated with the wire saw having the swing unit and that uses an electrodeposited diamond wire for the wire as an example will be described in brief as an exemplary embodiment of the present invention.

Referring to FIGS. 3 and 4, first, to cut the ingot I, the ingot I is disposed on the ingot holder 120. Then, the wire 51 is caused to run between the guide rollers R1 and R2 with a proper tension and at a proper speed, and the lifting unit 7 is operated. The lifting motor 39 of the lifting unit 7 is driven according to a program by the control unit (not shown). When the lifting motor 39 is driven, the lifting block 73 and the ingot I are lowered in the z-axial direction by the speed reducer 38 and the feed screw 37 connected to each other, and approach the wire 51. Diamond attached to the wire 51 interacts with the ingot I, and cuts the ingot I to a predetermined cutting depth. After the ingot I is cut to a cutting depth at one time, the lifting block 73 is lowered to the cutting depth, and the swing unit 9 is operated. The swing motor 140 of the swing unit 9 is driven according to a program by the control unit. When the swing motor 140 is driven, the first driving block 100 moves in the y-axial direction (see FIG. 5) by way of the speed reducer 142, the pinion 144, and the rack 146 connected to one another. As the first driving block 100 move left and right in the y-axial direction (see FIG. 5) at one time, the ingot holder 120 and the ingot I are swung, and the ingot I is cut to the cutting depth by the diamond. Afterwards, the ingot I is cut into multiple thin wafers by repetitive operations of the lifting unit 7 and the swing unit 9. After the ingot cutting process is terminated, the lifting block 73 is lifted, and the fixing unit 160 is demounted from the ingot mount 121. The thin wafers are separated from the dummy beam 163 (see FIG. 7) according to a conventional method known in the related art, and then undergo subsequent processes such as a chamfering process, a polishing process, and so on.

Next, an operation of the swing unit 9 according to the present invention will be described in greater detail. Here, for convenience of description and understanding, the wire saw 1 in which the wire is electrodeposited with diamond, the ingot has a circular cross section, and the second pivot shaft 125 of the swing unit 9 according to the present invention is located in the center of the ingot I will be described as an example. This description may be equally applied to the wire 51 to which an abrasive such as diamond is supplied in a slurry form, or the ingot having various shapes such as an angled shape.

Figure 9:
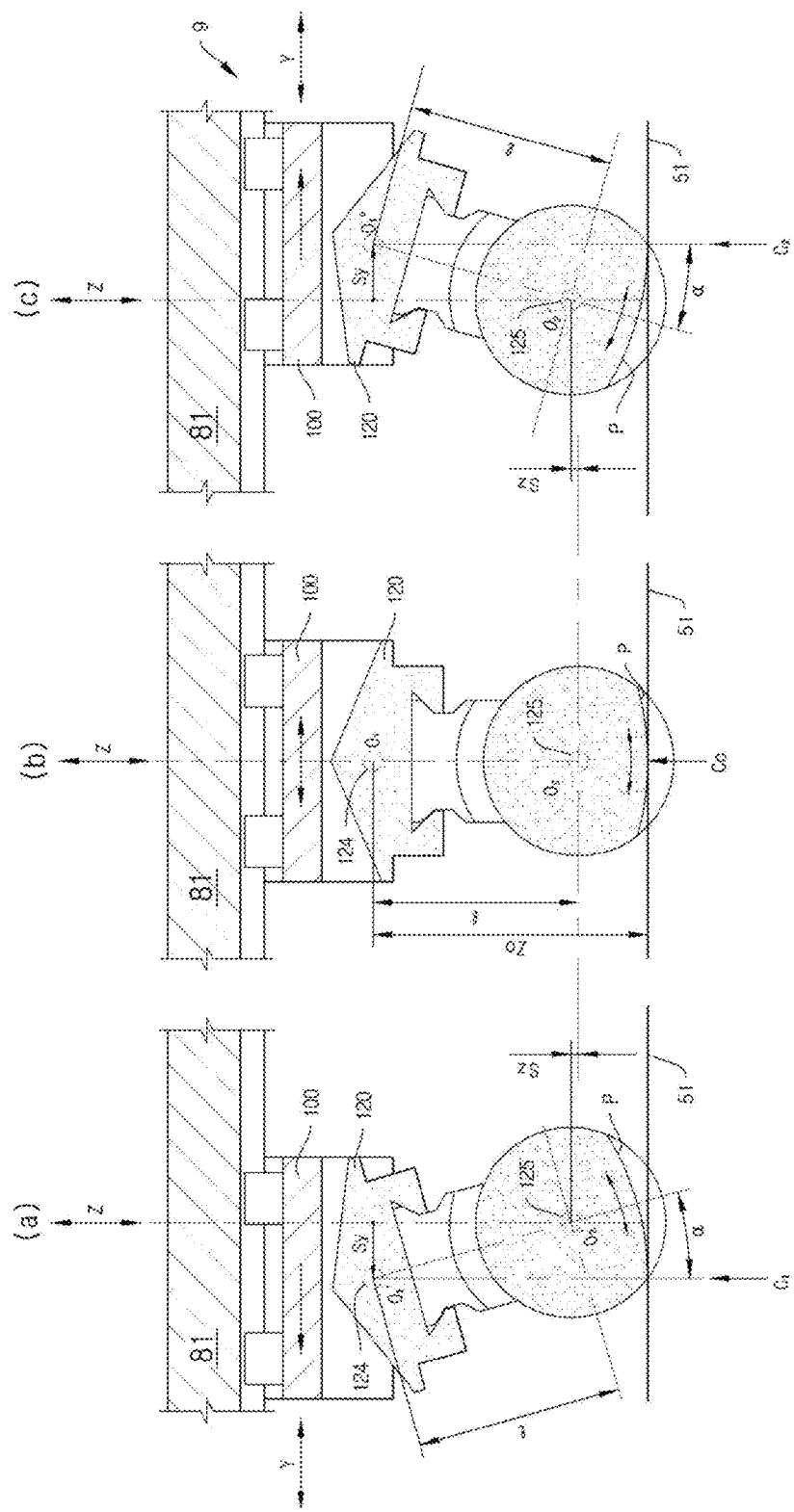

FIG. 9 is a view for describing an ingot swing in the wire saw as shown in FIG. 8 in the present invention. In FIG. 9, (a) is a cross-sectional view showing a state in which the ingot is swung along the wire in a rightward direction, (b) is a cross-sectional view showing a state in which the ingot is located in the center, and (c) is a cross-sectional view showing a state in which the ingot is swung along the wire in a leftward direction.

Referring to FIG. 9(a), when the first driving block 100 moves from the center to the left, the second driving block 110 (see FIG. 4) moves up. The first pivot shaft 124 is rotated about a rotational center $O_1$, and is translated to the left along with the first driving block 100. Further, the second pivot shaft 125 is also rotated about a rotational center $O_2$, and is translated upward along with the second driving block 110 (see FIG. 4). In this case, since a distance L between the first pivot shaft 124 and the second pivot shaft 125 is constant, the ingot holder 120 is swung around the first pivot shaft 124 serving as the swing central axis in a counterclockwise direction by an angle α corresponding to a distance at which the first pivot shaft 124 is translated. As the ingot holder 120 is swung, the ingot I is swung in the counterclockwise direction. As the ingot I is swung, a cut point $C_1$ of the ingot I relative to the wire 51 is changed, and the ingot I is cut. Here, as described above, during the swinging of the ingot I, the lifting block 73 (see FIG. 4) does not move in the z-axial direction, the distance L between the first pivot shaft 124 and the second pivot shaft 125 is constant. Further, a distance Zo between the first pivot shaft 124 and the wire 51 is constant. For this reason, an arc-shaped cut profile P is formed on the ingot I using the distance Zo from the first pivot shaft 124 to the cut point of the ingot during the swinging once as a swing radius. The cut point $C_1$ of the ingot I moves to the left that is the same direction as the moving direction of the first driving block 100 or the translating direction of the first pivot shaft 124.

Further, when the first driving block 100 moves from the left to the center, the operation is opposite to the aforementioned operation. In detail, the second driving block 110 (see FIG. 4) moves down, and the first pivot shaft 124 is rotated and translated toward the center from the left to the right along with the first driving block 100. Further, the second pivot shaft 125 is also rotated and translated downward along with the second driving block 110 (see FIG. 4). The ingot holder 120 is swung around the first pivot shaft 124 serving as the swing central axis in a clockwise direction by an angle corresponding to a distance at which the first pivot shaft 124 is translated. As the ingot holder 120 is swung, the ingot I is swung in the clockwise direction. As the ingot I is swung, the cut point of the ingot I relative to the wire 51 is changed, and the ingot I is cut. Further, an arc-shaped cut profile P is formed on the ingot I using the distance Zo from the first pivot shaft 124 to the cut point of the ingot during the swinging once as the swing radius. The cut point of the ingot I moves to the right that is the same direction as the moving direction of the first driving block 100 or the translating direction of the first pivot shaft 124.

Referring to FIG. 9(b), the first pivot shaft 124 and the second pivot shaft 125 are located on the extension lines thereof in the z-axial direction, the cut point Co of the ingot I is located in the center of the ingot cut profile.

Referring to FIG. 9(c), when the first driving block 100 moves from the center to the right, the second driving block 110 (see FIG. 4) moves up, and the first pivot shaft 124 is rotated and translated from the center to the right along with the first driving block 100. Further, the second pivot shaft 125 is also rotated and translated upward along with the second driving block 110 (see FIG. 4). The ingot holder 120 is swung around the first pivot shaft 124 serving as the swing central axis in a clockwise direction by an angle α corresponding to a distance at which the first pivot shaft 124 is translated. As the ingot holder 120 is swung, the ingot I is swung in the clockwise direction. As the ingot I is swung, the cut point $C_2$ of the ingot I relative to the wire 51 is changed, and the ingot I is cut. Further, an arc-shaped cut profile P is formed on the ingot I using the distance Zo from the first pivot shaft 124 to the cut point $C_2$ of the ingot during the swinging once as the swing radius. The cut point $C_2$ of the ingot I moves to the right that is the same direction as the moving direction of the first driving block 100 or the translating direction of the first pivot shaft 124.

When the first driving block 100 moves from the right to the center, the second driving block 110 (see FIG. 4) moves down, and the first pivot shaft 124 is rotated and translated from the right to the center along with the first driving block 100. Further, the second pivot shaft 125 is also rotated and translated downward along with the second driving block 110 (see FIG. 4). The ingot holder 120 is swung around the first pivot shaft 124 serving as the swing central axis in a counterclockwise direction by an angle corresponding to a distance at which the first pivot shaft 124 is translated. As the ingot holder 120 is swung, the ingot I is swung in a counterclockwise direction. As the ingot I is swung, the cut point of the ingot I relative to the wire 51 is changed, and the ingot I is cut. Further, an arc-shaped cut profile P is formed on the ingot I using the distance from the first pivot shaft 124 to the cut point of the ingot during the swinging once as the swing radius. The cut point of the ingot I moves in the same direction as the moving direction of the first driving block 100 or the translating direction of the first pivot shaft 124.

In the swing unit 9 described with reference to FIGS. 1 to 9 in accordance with an exemplary embodiment of the present invention, the ingot holder 120 is disposed between the first driving block 100 and the second driving block 110, and the first fixing block 100 and the second fixing block 110 move in the direction perpendicular to each other. The ingot holder 120 is coupled to the driving blocks 100 and 110 via the first and second pivot shafts 124 and 125. The ingot holder 120 can be swung according to the rotation and translation of the first and second pivot shafts 124 and 125. Only the first driving block 100 moves, i.e. only the swing motor 140 of the first driving block 100 is controlled. Thereby, it is possible to reduce the translation of the ingot I in the running direction of the wire 51 at the same time when the ingot I is swung. Particularly, when the second pivot shaft 125 is located in the center of the ingot I, it is possible to prevent the ingot I from being translated in the running direction of the wire 51.

In the case of the swing unit 9 according to the present invention, unlike a conventional swing that allows the ingot I to simply oscillate left and right in the running direction of the wire 51, a swing (hereinafter referred to as "lift-up swing") that reduces the horizontal movement of the ingot I in the running direction (y-axial direction) of the wire to allow vertical movement and enables the ingot I to be cut at a contact length close to a point contact is realized. The lift-up swing caused by the swing unit 9 according to the present invention reduces the movement of the ingot I based on a change in angular velocity and applied load at the cut point of the ingot I, and simultaneously is favorable to optimized cutting of the ingot I. The lift-up swing will be described below in greater detail with reference to the drawings.

Referring to FIG. 9, when a distance at which the first driving block 100 moves is Sy, a distance at which the second driving block 110 moves is Sz, a swing angle is a, and a distance between the center of the first pivot shaft and the center of the second pivot shaft 125 is L, the distance at which the first driving block 100 moves is given as in Equation 3 below.

$$Sy = L \cdot \sin \alpha \qquad \text{Equation 3}$$

When the first driving block 100 moves, the distance Sz at which the second driving block 110 moves is expressed by: $Sz = L \cdot (1 - \cos \alpha)$.

As suggested in U.S. Pat. No. 4,646,710 above, the maximum radius of curvature for cutting the ingot I with the cut profile close to the point contact can be determined using Equation 2. When the size of the ingot I is given, the distance L between the center of the first pivot shaft and the center of the second pivot shaft 125 can be determined in Equation 3 above. Further, when the swing angle is determined, it can be seen how far the first driving block 100 should move.

Meanwhile, when a speed at which the first driving block 100 moves is V, and a rotating speed of the ingot I, i.e. a swing angular velocity is ω, the velocity at which the first driving block 100 moves is given as in Equation 4.

$$V = L \cdot \cos \alpha \cdot \omega \qquad \text{Equation 4}$$

In Equation 4, when the first driving block 100 moves at a constant speed V, the rotating speed ω of the ingot I, i.e. the swing angular velocity, is given by $V/(L \cdot \cos \alpha)$.

Figure 10:
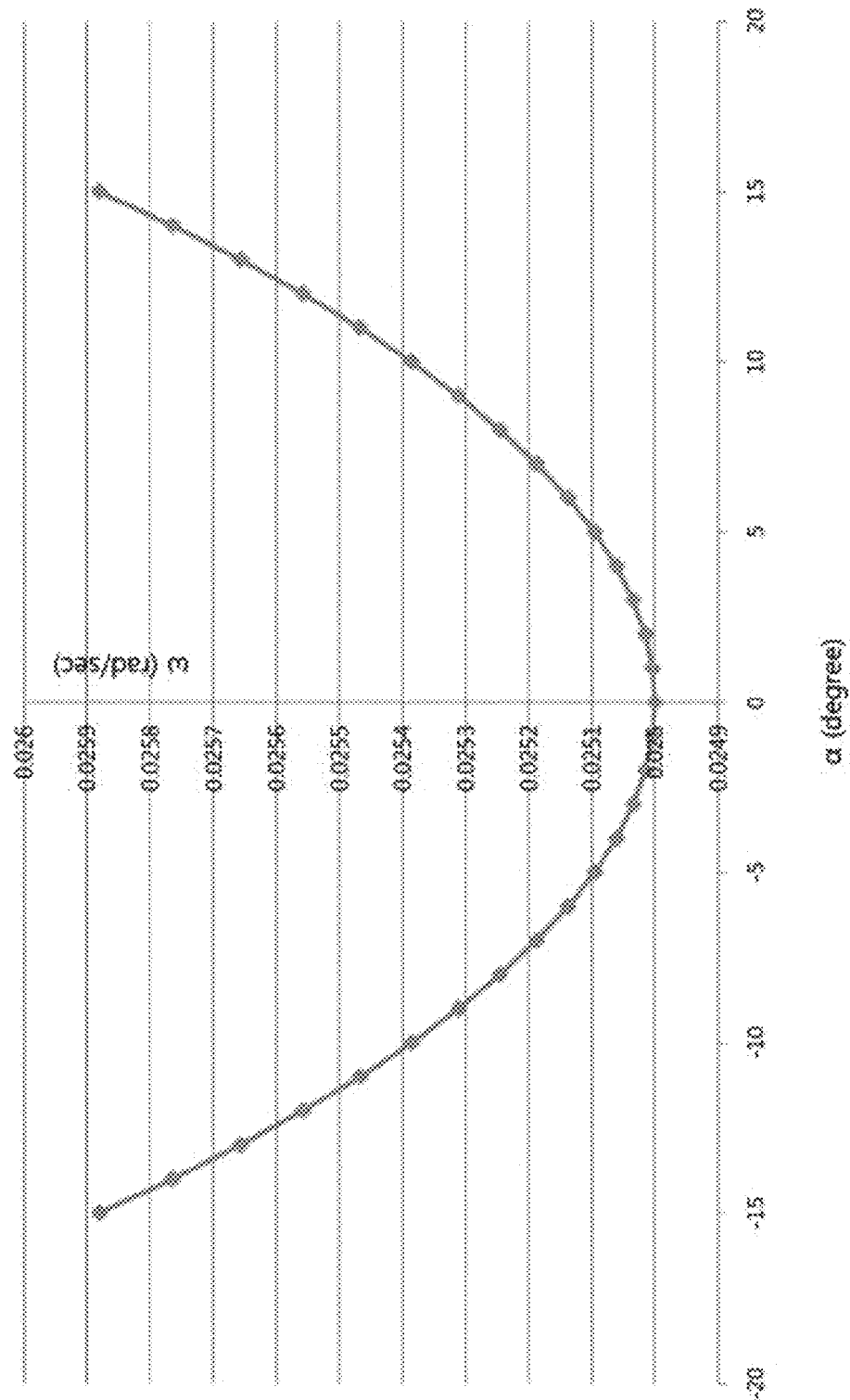
FIG. 10 is a graph showing a change in swing angular velocity over a swing angle on the basis of constant speed control of the first driving block in accordance with the present invention.

FIG. 10 is a graph showing a change in swing angular velocity over a swing angle on the basis of constant speed control of the first driving block in accordance with the present invention. The graph shown in FIG. 10 shows distribution of the swing angular velocity ω of the ingot when the moving speed V of the first driving block 100 is 10 mm/sec and when the distance L between the centers of the first pivot shaft 124 and the second pivot shaft 125 is 400 mm, in Equation 4.

Referring to FIG. 10, as can be seen from Equation 4, when the first driving block 100 moves at the constant speed V, the rotating speed ω of the ingot I, i.e. the swing angular velocity, is increased in proportion to a value of cosine. Thus, in the case of the swing unit 9 according to the present invention, when the moving speed V of the first driving block 100 is controlled by the cosine value of Equation 4, the rotating speed ω of the ingot I, i.e. the swing angular velocity, can be kept constant. It is desirable to naturally increase or reduce the moving speed V of the first driving block 100 in view of the control of the first driving block 100 by the swing motor 140 (see FIG. 4). In the case of the swing unit 9 according to the present invention, it is desirable that the moving speed V of the first driving block 100 can be naturally increased or reduced depending on the cosine value. Particularly, it is desirable that, when the first driving block 100 undergoes a change of direction caused by the translation in the y-axial direction, the ingot I can be naturally swung at a left or right end of the y-axial direction.

Meanwhile, as shown in FIG. 9, when the ingot is cut by the swing unit according to the present invention, the cut points $C_1$, $C_0$, and $C_2$ of the ingot relative to the wire (see FIG. 9) move in the moving direction of the first driving block 100. Further, as can be seen from Equation 4, the cut points have a speed profile in which, as the first driving block 100 moves from the center to the left or the right, the swing angular velocity ω is increased. Due to the change and speed profile of the cut point, the ingot cutting process is more advantageous for optimization with respect to a change in cutting environment or process condition of the ingot I, which will be described below with reference to FIGS. 11 and 12.

Figure 11:
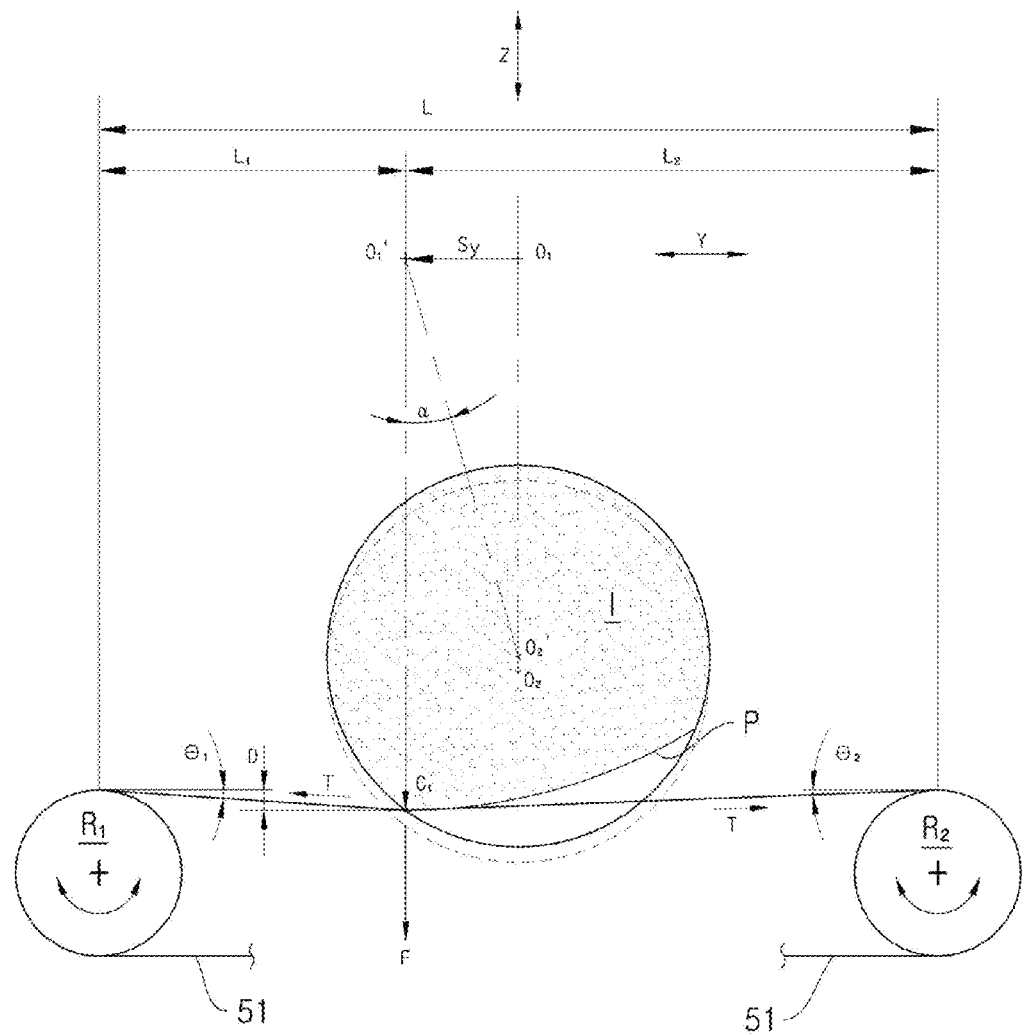
FIG. 11 is a conceptual diagram for describing a change in load according to a change of the cut point of the ingot.

FIG. 11 is a conceptual diagram for describing a change in load according to a position of the cut point of the ingot. When the ingot is cut according to the present invention, the cut point of the ingot is shifted from the center to the left. This is equivalent to FIGS. 9(a) and 9(b). Thus, the same symbols having the same meaning as FIGS. 9(a) and 9(b) are used. However, for convenience of description and understanding, the representative parts are shown. The ingot as shown in FIG. 9(a) is depicted by a solid line, and the ingot as shown in FIG. 9(b) is depicted by a broken line.

Referring to FIG. 11, the wire 51 is guided to the two guide rollers R1 and R2, and runs between the guide rollers R1 and R2 at a high speed. When the ingot I approaches the wire by the lifting unit 7 (see FIG. 4), and is cut, the deflection D of the wire occurs. Further, when the ingot I is swung by the swing unit 9 (see FIG. 9) according to the present invention, the cut point $C_1$ of the ingot varies depending on the first driving block 100 (see FIG. 9). Here, when the distance between the guide rollers $R_1$ and $R_2$ is L, deflection angles against the cut point $C_1$ of the ingot I are $\theta_1$ and $\theta_2$, distances of the wire 51 from the centers of the guide rollers $R_1$ and $R_2$ to the cut point $C_1$ are $L_1$ and $L_2$, and tension of the wire 51 is T. An applied load F is given as in Equation 5 below.

$$F = T \cdot (\sin \theta_1 + \sin \theta_2) = T \cdot D \cdot (1/\sqrt{(L_1^2 + D^2)} + 1/\sqrt{(L_2^2 + D^2)}) \qquad \text{Equation 5}$$

In Equation 5, when a load is applied to the center between the guide rollers $R_1$ and $R_2$, $L_1 = L_2 = L/2$, and the load F is $T \cdot D (1/\sqrt{(L^2 + D^2)})$.

As can be seen from Equation 1 suggested in U.S. Pat. No. 4,646,710 as described above, the deflection D of the wire is constant in the geometrical relation depending on the distance between the guide rollers $R_1$ and $R_2$ and the radius of curvature of the cut profile with respect to a constant feed load. However, as can be seen from Equation 5, even when the deflection D of the wire 51 is constant, the applied load F varies when the cut points $C_1$, $C_0$, and $C_2$ of the ingot I coming into contact with the wire 51 (see FIG. 9) vary.

Table 1 below shows a change in load according to the position of the cut point when the wire 51 in which the distance between the guide rollers $R_1$ and $R_2$ is 470 mm has deflection of 10 mm and tension of 40 N.

TABLE 1

| L1(mm) | L2(mm) | F(N) |
|---|---|---|
| 125 | 345 | 4.3 |
| 135 | 335 | 4.1 |
| 145 | 325 | 4.0 |
| 155 | 315 | 3.8 |
| 165 | 305 | 3.7 |
| 175 | 295 | 3.6 |
| 185 | 285 | 3.6 |
| 195 | 275 | 3.5 |
| 205 | 265 | 3.5 |
| 215 | 255 | 3.4 |
| 225 | 245 | 3.4 |

TABLE 1-continued

| L1(mm) | L2(mm) | F(N) |
|---|---|---|
| 235 | 235 | 3.4 |
| 245 | 225 | 3.4 |
| 255 | 215 | 3.4 |
| 265 | 205 | 3.5 |
| 275 | 195 | 3.5 |
| 285 | 185 | 3.6 |
| 295 | 175 | 3.6 |
| 305 | 165 | 3.7 |
| 315 | 155 | 3.8 |
| 325 | 145 | 4.0 |
| 335 | 135 | 4.1 |
| 345 | 125 | 4.3 |

Figure 12:
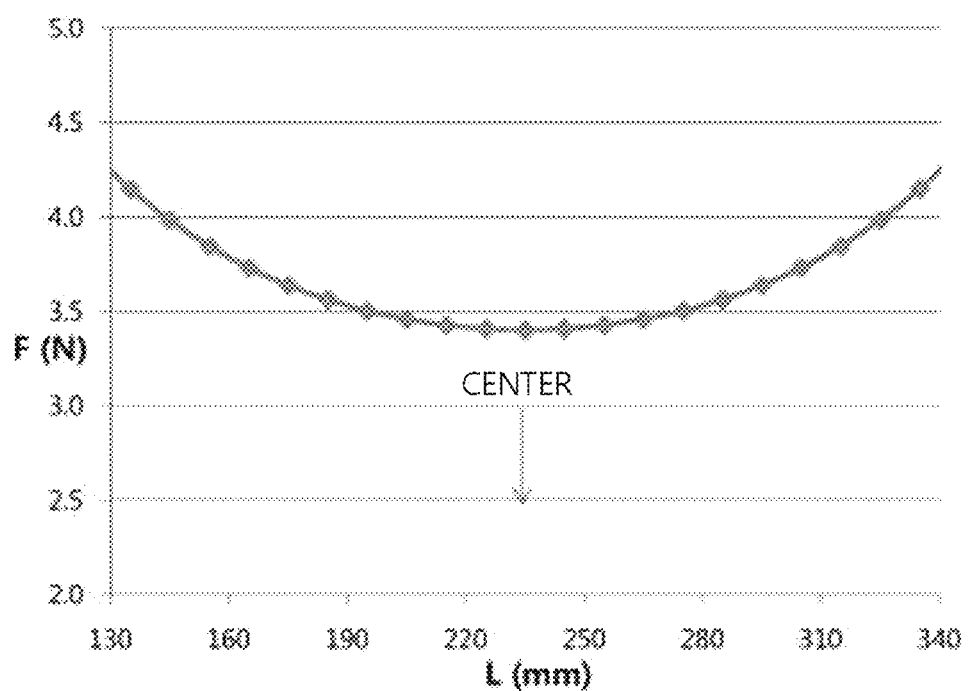
FIG. 12 is a graph showing the change in load according to the change of the cut point of the ingot coming into contact with the wire.

FIG. 12 is a graph showing a change in load according to the position of the cut point of Table 1.

Referring to FIG. 12 and Table 1, the load of 3.4 N is applied to the cut point at the central position of 235 mm distant from the guide rollers $R_1$ and $R_2$, but is increased with the approach to the left and right. In this way, when the position of the cut point is changed with respect to the radius of curvature of the cut profile, the contact length, and the deflection, a change in load occurs. When the load is increased, this increases an applied pressure of the ingot I, i.e. the interaction between the diamond abrasive and the ingot I, and thus the cutting performance of the ingot I is improved. When the ingot I is cut while being swung by the swing unit 9 according to the present invention, the cut point of the ingot I moves in the moving direction of the first driving block 100, and the applied load F is increased. Particularly, as described with reference to Related Art 1, when the cut point is not within the maximum swing angle range, the contact length is increased on an outer side of the cut profile, and the cuttability is reduced. In contrast, when the swing unit 9 of the wire saw 1 according to the present invention is applied, the applied load F is increased with the approach to the outer side of the cut profile, and the applied pressure of the diamond abrasive is increased, so that the cutting performance of the ingot I is improved. Even when the ingot I is not swung at the maximum swing angle, the cuttability can be improved. As such, the rotary arm 123 (see FIG. 4) as shown can be reduced, which is favorable in realizing the wire saw 1 having a small size and high rigidity.

Further, with the swing unit 9 according to the present invention, it is possible to easily achieve uniform cutting of an ingot by taking into consideration the swing angular velocity of the ingot I according to Equation 4 and the applied load F according to Equation 5. In detail, since the applied load F is greater at the outer portion of the cut profile P of the ingot I (see FIG. 9), the degree of cut is large, but the angular velocity of the ingot I is great. Further, the degree of cut is small at the central portion of the cut profile P (see FIG. 9), but the angular velocity of the ingot I is small. In this way, since a complementary condition is provided in the case of the swing unit 9 according to the present invention, it is possible to easily achieve uniform cutting when the speed is reduced at the outer portion of the cut profile and is increased at the central portion of the cut profile. In this way, the process conditions, i.e. the moving distance, the swing angular velocity ω, and the applied load F, for optimally cutting the ingot I using the swing unit 9 according to the present invention can be obtained from Equations 3 to 5, and can be met by controlling only the first driving block 100. As such, simple control and precise control are possible, and the swing unit 9 having a high-rigidity structure is obtained and simplified in structure. Thereby, it is very favorable that the machine can be miniaturized.

As described above, the wire saw 1 according to the present invention has been shown and described in greater detail with reference to the attached drawings. However, it is apparent to those skilled in the art that there may be various examples of changing a position or disposition, or changing a structure with the same function. For example, one of the first driving block 100 and the second driving block 110 may move the ingot holder 120, and the other may manually move in an orthogonal direction. The first driving block 100 may be caused to move in a direction perpendicular to the second driving block 110, and the second driving block 110 may be caused to move on the cutting plane or in the ingot cutting direction. The first driving block 100 and the second driving block 110 are provided to move in a direction perpendicular to each other simultaneously or separately. The ingot holder 120 and/or the second driving block 110 may be coupled between the pivot shafts 124 and 125 via the bearings 106 and 116, and the lifting block 73 or the driving blocks 100 and 110 may be caused to move. To this end, the rails 82 and 86 and the slide guides 103 and 113 may be projected or recessed to form the channel 86a. Accordingly, it is apparent to those skilled in the art that the swing unit 9 can be variously deformed and changed. Further, it should be understood that additions, omissions, substitutions, and other modifications can be made without departing from the spirit or scope of the present invention. All equivalent changes and modifications of the embodiments that carry the key technical features of the invention should be considered to be within the scope of the invention.

The invention claimed is:

1. A wire saw comprising:
   first and second driving blocks moving in a direction perpendicular to each other;
   an ingot holder coupled to the first and second driving blocks so as to be able to be swung according to the movement of one of the first and second driving blocks; and
   a lifting block transferring the ingot holder in parallel with a direction in which an ingot is cut, wherein the ingot holder is disposed between the first driving block and the second driving block.

2. The wire saw according to claim 1, wherein:
   the first driving block moves in parallel with a direction in which a wire runs; and
   the second driving block moves in parallel with the direction in which the ingot is cut.

3. The wire saw according to claim 1, wherein the ingot holder is coupled with at least one of the first driving block and the second driving block by a pivot shaft.

4. The wire saw according to claim 1, wherein:
   the ingot holder is coupled with the first driving block by a first pivot shaft and is coupled with the second driving block by a second pivot shaft; and
   a distance between the first pivot shaft and the second pivot shaft is kept constant during swinging of the ingot.

5. The wire saw according to claim 4, wherein the first pivot shaft and the second pivot shaft are translated in a direction perpendicular to each other during swinging of the ingot holder.

6. The wire saw according to claim 4, wherein a distance to which one of the first pivot shaft and the second pivot shaft moves in parallel with a direction in which a wire runs meets Equation 3 below:

$$Sy = L \cdot \sin \alpha \qquad \text{Equation 3}$$

Where Sy is the moving distance, L is the distance between the center of the first pivot shaft and the center of the second pivot shaft, and $\alpha$ is the angle at which the ingot holder is swung.

7. The wire saw according to claim 1, further comprising at least two guide rollers for guiding a wire running in one or opposite directions, and a frame on which the guide rollers are installed and which is installed to allow the lifting block to be lifted in parallel with the direction in which the ingot is cut, and
wherein the first driving block is installed on the lifting block, and the second driving block is installed on the frame or the lifting block.

8. A wire saw comprising:
a first driving block moving in parallel with a direction in which a wire runs;
an ingot holder coupled with the first driving block by a pivot shaft; and
a second driving block installed on the ingot holder so as to be able to move in parallel with a direction in which an ingot is cut according to the movement of the first driving block and to allow the ingot holder to be swung around the pivot shaft.

9. A wire saw comprising:
at least two guide rollers installed on a frame to guide a wire running in one or opposite directions;
a lifting block installed on the frame so as to be lifted in parallel with a direction in which an ingot is cut;
a first driving block installed on the frame or the lifting block so as to be movable in parallel with the direction in which the wire runs;
a second driving block installed on the frame or the lifting block so as to be movable in parallel with the direction in which the ingot is cut; and
an ingot holder coupled with the first and second driving blocks so as to be able to be swung according to movement of a first part of one of the first and second driving blocks.

10. The wire saw according to claim 9, further comprising:
first rails provided for the lifting block in parallel with the direction in which the wire runs;
a second rail provided for the frame or the lifting block in parallel with the direction in which the ingot is cut;
first slide guides mounted on the first driving block so as to be movable along the first rails; and
a second slide guide mounted on the second driving block so as to be movable along the second rail.

11. The wire saw according to claim 10, wherein the first and second rails are projected or recessed in a channel shape so as to allow the first and second slide guides to be movably guided.

* * * * *